United States Patent
Shin et al.

(10) Patent No.: US 7,979,568 B2
(45) Date of Patent: Jul. 12, 2011

(54) METHOD AND APPARATUS FOR CREATING LAST UNIFORM RESOURCE IDENTIFIER, AND RECORDING MEDIUM STORING PROGRAM FOR EXECUTING THE METHOD

(75) Inventors: Seong-kook Shin, Seoul (KR); Young-yoon Kim, Seoul (KR); Du-il Kim, Suwon-si (KR); Jin-yong Ahn, Suwon-si (KR); Hyok-sung Choi, Yongin-si (KR); Hee-yeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 794 days.

(21) Appl. No.: 11/491,102

(22) Filed: Jul. 24, 2006

(65) Prior Publication Data

US 2007/0022089 A1 Jan. 25, 2007

Related U.S. Application Data

(60) Provisional application No. 60/701,481, filed on Jul. 22, 2005.

(30) Foreign Application Priority Data

Oct. 17, 2005 (KR) ........................ 10-2005-0097725

(51) Int. Cl.
G06F 15/177 (2006.01)
G06F 17/30 (2006.01)
(52) U.S. Cl. ........................................ 709/230; 707/726
(58) Field of Classification Search .................. 707/726; 709/217, 224, 230, 246
See application file for complete search history.

(56) References Cited

U.S. PATENT DOCUMENTS

| | | | | |
|---|---|---|---|---|
| 6,269,122 | B1 * | 7/2001 | Prasad et al. | 375/240.28 |
| 6,549,922 | B1 * | 4/2003 | Srivastava et al. | 1/1 |
| 7,441,062 | B2 * | 10/2008 | Novotney et al. | 710/303 |
| 7,610,296 | B2 * | 10/2009 | Hughes et al. | 1/1 |
| 2001/0056506 | A1 | 12/2001 | Munetsugu et al. | |
| 2002/0044199 | A1 * | 4/2002 | Barzebar et al. | 348/14.01 |
| 2004/0098750 | A1 * | 5/2004 | Kim | 725/113 |
| 2005/0071762 | A1 * | 3/2005 | Kim et al. | 715/719 |
| 2005/0099511 | A1 * | 5/2005 | Cazier | 348/231.4 |
| 2005/0223035 | A1 * | 10/2005 | Shin et al. | 707/104.1 |
| 2005/0223037 | A1 * | 10/2005 | Ahn et al. | 707/104.1 |
| 2005/0270825 | A1 * | 12/2005 | Tanaka et al. | 365/154 |
| 2006/0026186 | A1 * | 2/2006 | Kim | 707/101 |
| 2006/0095852 | A1 * | 5/2006 | Trepess et al. | 715/741 |
| 2007/0094231 | A1 * | 4/2007 | Kim | 707/1 |

OTHER PUBLICATIONS

MPV Music Profile Specification http://www.osta.org/mpv/public/specs/mpvmusic-Prof-Spec-1.00.PDF Revision 1.00 Jan. 7, 2004.*
MPV Core Specification http://www.osta.orgImpvipubrm/specsIMPVCore-Spec.I.01.PDF Revision 1.01 Mar. 11, 2003.*
MPV Basic Profile Specification http://www.osta.org/mpv/public/specs/MPVBasic-Profile-Spec-1.0 I.PDF Revision 1.01 Mar. 11, 2003.*

* cited by examiner

*Primary Examiner* — George C Neurauter, Jr.
*Assistant Examiner* — Sargon N Nano
(74) *Attorney, Agent, or Firm* — Sughrue Mion, PLLC

(57) ABSTRACT

A method and apparatus for creating a LastURI (uniform resource identifier) of a content asset in order to share the content asset based on a multiphoto video (MPV) file in content recorders and/or reproducers having different file systems, and a recording medium storing program for executing the method are provided. The method creates one of an absolute LastURI and a relative LastURI as the LastURI of the content asset according to protocol type information, so that content recorders and/or reproducers using different file systems can easily find and share the content asset based on the MPV file.

11 Claims, 4 Drawing Sheets ns identifier) according to an
embodiment of the present invention;
FIG. 2 illustrates a relation between content assets and
MPV files according to an embodiment of the present invention;
FIG. 3 is a flowchart illustrating a method of creating a
LastURI according to an embodiment of the present invention; and
FIG. 4 is a detailed flowchart illustrating a method of
creating a LastURI of a content asset based on protocol type
information.

METHOD AND APPARATUS FOR CREATING LAST UNIFORM RESOURCE IDENTIFIER, AND RECORDING MEDIUM STORING PROGRAM FOR EXECUTING THE METHOD

CROSS-REFERENCE TO RELATED PATENT APPLICATION

This application claims the benefit of Korean Patent Application No. 10-2005-0097725, filed on Oct. 17, 2005, in the Korean Intellectual Property Office and U.S. Provisional Application No. 60/701,481, filed on Jul. 22, 2005, in the U.S. Patent and Trademark Office, the disclosures of which are incorporated herein in their entirety by reference.

BACKGROUND OF THE INVENTION

1. Field of the Invention

The present invention relates to a method and apparatus for creating a LastURI (uniform resource identifier) specifying the location of content assets in a multimedia application environment, and a recording medium storing a program for executing the method.

2. Description of the Related Art

Personal computers are used to process and reproduce media files such as still images, digital videos, digital audios, texts, etc. These media files are created using digital cameras, digital camcorders, digital audio reproducers such as MP3, WMA, etc.

However, content reproducers such as personal computers and content producers are not compatible with each other since they have different information structures and use different data processing methods. To solve this problem, multiphoto video (MPV) standards are being developed by the Optical Storage Technology Association (OSTA) and an International Imaging Industry Association (I3A).

MPV standards regulate how to easily manage, reproduce, and exchange multimedia files such as still images, digital videos, digital audio, texts, documents, etc., which are stored in storage media or storage devices such as optical discs, memory cards, computer hard discs or exchanged over the Internet.

MPV standards define a LastURI (uniform resource identifier) specifying the location of content assets. The LastURI is also referred to as a LastURL (uniform resource locator). Thus, MPV files produced according to MPV standards include a LastURI of a content asset by which the content asset can be read and reproduced.

However, if content recorders and/or reproducers have different types of file systems, the MPV files include different LastURI of the content asset. That is because the format representing a file is different according to the type of file system. For example, when the operating system is Windows, a path starts with a "drive name", whereas, when the operating system is Linux, the path starts with "/". Therefore, when the operating system is Windows, the LastURI of a content asset produced by the content recorder is, for example, "c:/media/image.jpg", whereas, when the operating system is Linux, the LastURI of the content asset produced by the content recorder is, for example, "/media/image.jpg".

Hence, since content recorders and/or reproducers having different file systems cannot find a content asset based on a LastURI included in an MPV file, they cannot share the content asset based on the MPV file.

SUMMARY OF THE INVENTION

The present invention provides a method and apparatus for creating a LastURI (uniform resource identifier) for a content asset which permits sharing of a content asset created as a multiphoto video (MPV) file in content recorders and/or reproducers having different file systems, and a recording medium storing a program for executing the method.

According to an aspect of the present invention, there is provided a method of creating a LastURI (uniform resource identifier) comprising: detecting protocol type information from information on the location of a content asset; and creating one of an absolute LastURI and a relative LastURI as the LastURI of the content asset according to the protocol type information.

According to another aspect of the present invention, there is provided an apparatus for creating a LastURI comprising: a detector detecting protocol type information from information on the location of a content asset; and a LastURI creator creating one of an absolute LastURI and a relative LastURI as the LastURI of the content asset according to the protocol type information detected by the detector.

According to another aspect of the present invention, there is provided a computer readable medium having embodied thereon a computer program for executing a method of creating a LastURI specifying the location of a content asset in a multimedia application environment, the method comprising: detecting protocol type information from information on the location of the content asset; and creating one of an absolute LastURI and a relative LastURI as the LastURI of the content asset according to the protocol type information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
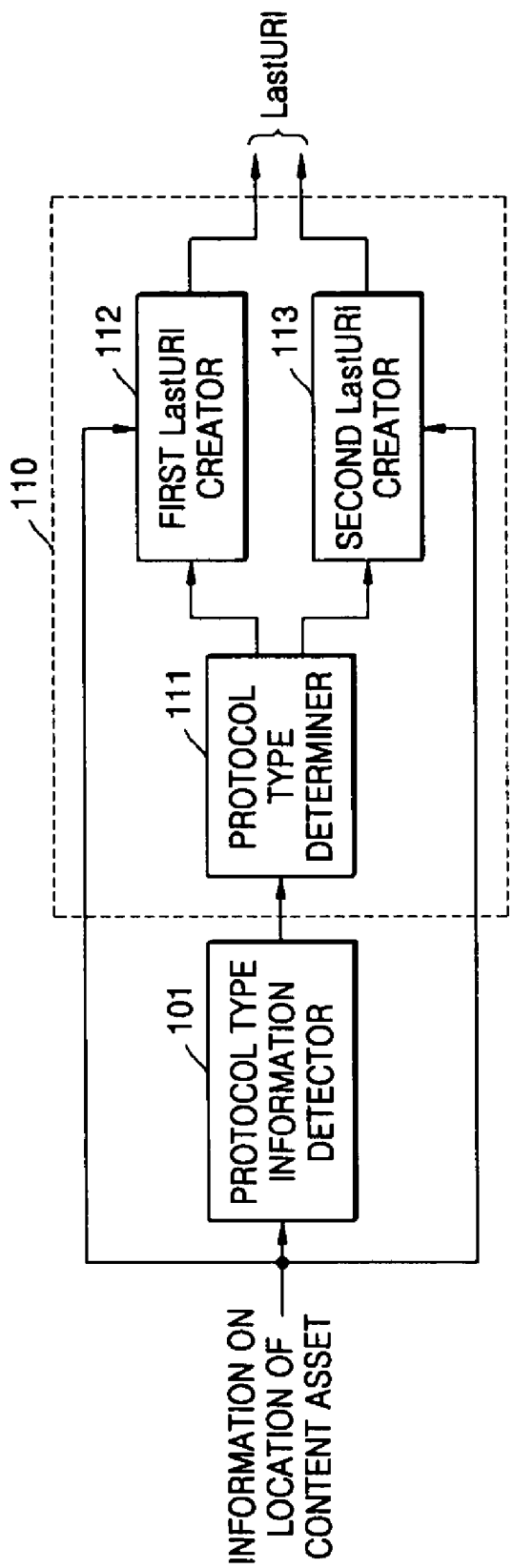
FIG. 1 is a block diagram of an apparatus for creating a LastURI (uniform resource identifier) according to an embodiment of the present invention.

FIG. 1 is a block diagram of an apparatus for creating a LastURI (uniform resource identifier) according to an embodiment of the present invention. Referring to FIG. 1, the (apparatus for creating the LastURI comprises a protocol type information detector 101 and a LastURI creator 110.

When the protocol type information detector 101 receives information on the location of a content asset, the protocol type information detector 101 detects protocol type information included in the information on the location of the content asset. In detail, the protocol type information detector 101 detects information on a network domain such as a hypertext-transfer protocol (HTTP), a file transfer protocol (FTP), etc., or a local domain designating a drive from the information on the location of the content asset. The protocol type information detector 101 finds a specific identifier such as colon (:)

from the information on the location of the content asset, detects information before the specific identifier as the protocol type information or previously stores protocol type information to be received, and, if the information on the location of the content asset includes information matching a stored protocol type, detects the matching information as the protocol type information.

The information on the location of the content asset includes protocol type information, information on a name and a path of the content asset (or information on the directory location of the content asset), and information on a name and a path of a multiphoto video (MPV) file (or information on the directory location of the MPV file). The information on the path of the content asset includes a website address of the content asset when a protocol type is a network domain. The information on the location of the content asset can be input by a user.

The protocol type information detector 101 transmits the detected protocol type information to the LastURI creator 110.

When the LastURI creator 110 receives the protocol type information from the protocol type information detector 101, the LastURI creator 110 creates one of an absolute LastURI and a relative LastURI as a LastURI of the content asset using the information on the location of the content asset according to the received protocol type information.

To this end, the LastURI creator 110 comprises a protocol type determiner 111, a first LastURI creator 112, and a second LastURI creator 113.

When the protocol type determiner 111 receives the protocol type information, the protocol type determiner 111 determines whether the received protocol type information indicates a network domain or a local domain. If the protocol type information is a transmission protocol, the protocol type determiner 111 determines that the protocol type information indicates a network domain. If the protocol type information is not a transmission protocol, the protocol type determiner 111 determines that the protocol type information indicates the local domain.

The protocol type determiner 111 controls the first LastURI creator 112 and the second LastURI creator 113 according to a result obtained by determining the protocol type information. In detail, if the protocol type information indicates a network domain, the protocol type determiner 111 operates the first LastURI creator 112, and, if the protocol type information indicates a local domain, the protocol type determiner 111 operates the second LastURI creator 113.

If the protocol type determiner 111 determines that the protocol type information is a network domain, the first LastURI creator 112 creates an absolute LastURI of the content asset. The first LastURI creator 112 creates the absolute LastURI based on the protocol type information included in the location of the content asset and the information on the path of the content asset. For example, the first LastURI creator 112 creates the absolute LastURI such as "http://os.osta.org/mpv/album.pvm".

If the protocol type determiner 111 determines that the protocol type information is a local domain, the second LastURI creator 113 creates a relative LastURI based on the information on the path of the content asset, i.e., an MPV file corresponding to the content asset included in the information on the location of the content asset.

Figure 2:
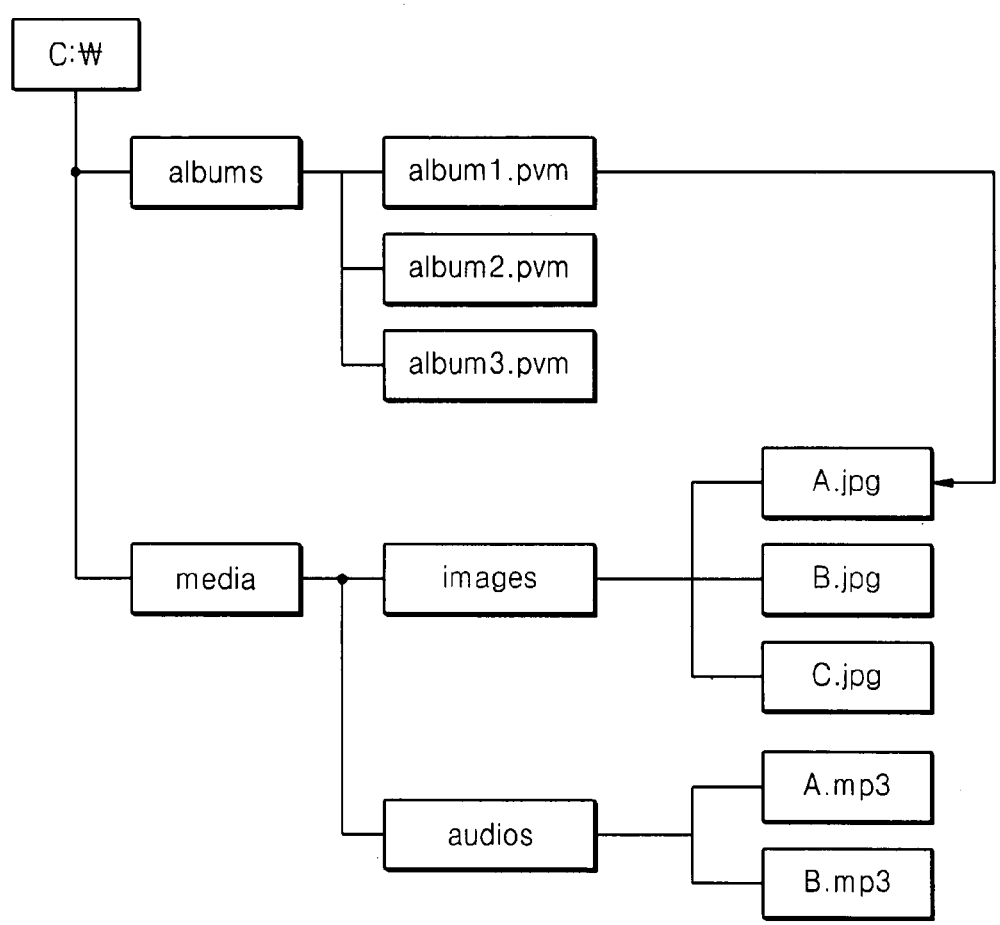
FIG. 2 illustrates a relation between content assets and MPV files according to an embodiment of the present invention.

Referring to FIG. 2 that illustrates a relation between content assets and MPV files according to an embodiment of the present invention, if the protocol type determiner 111 manages a content asset file in a tree structure and receives information on the location of a content asset "A.jpg", i.e., the information on the location of an MPV file corresponding to the content asset "A.jpg" is "album1.pvm", the second LastURI 113 creates " . . . /media/images/A.jpg" as the relative LastURI of the content asset "A.jpg" based on "album1.pvm". In FIG. 2, "albums" can be defined as a current directory of "album1.pvm" and the relative LastURI " . . . /media/images/A.jpg" of the content asset "A.jpg" can be created on the basis of the current directory "albums".

The absolute or relative LastURI created by the first or second LastURI 112 or 113 is transmitted to an MPV file formatter (not shown) to be included in the MPV file. The apparatus for creating a LastURI illustrated in FIG. 1 can be included in an apparatus for creating the MPV file of the content asset.

Figure 3:
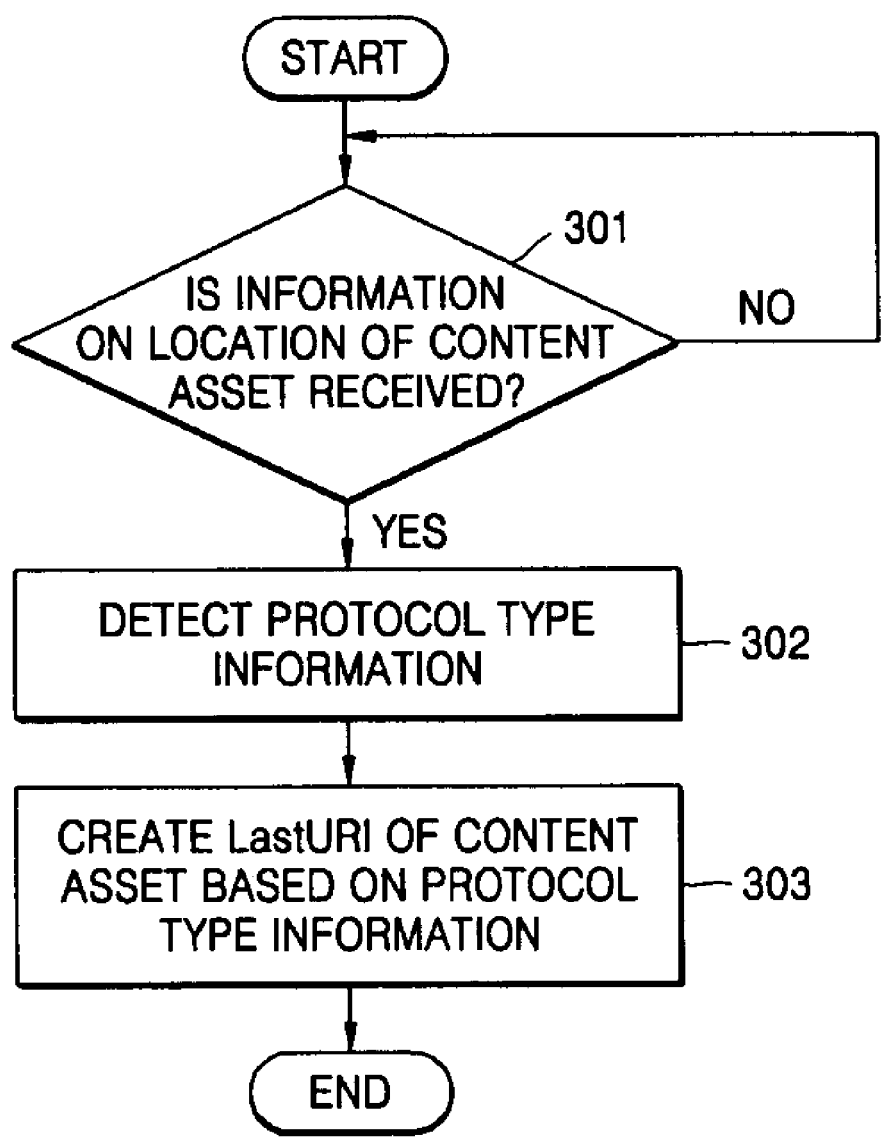
FIG. 3 is a flowchart illustrating a method of creating a LastURI according to an embodiment of the present invention.

FIG. 3 is a flowchart illustrating a method of creating a LastURI according to an embodiment of the present invention. Referring to FIG. 3, it is determined whether a user inputs information on the location of a content asset (Operation 301). The information on the location of the content asset is described with reference to FIG. 1.

If it is determined that the user inputs the information on the location of the content asset, protocol type information is detected from the information on the location of the content asset (Operation 302). How to detect the protocol type information from the information on the location of the content asset is described with reference to FIG. 1.

Figure 4:
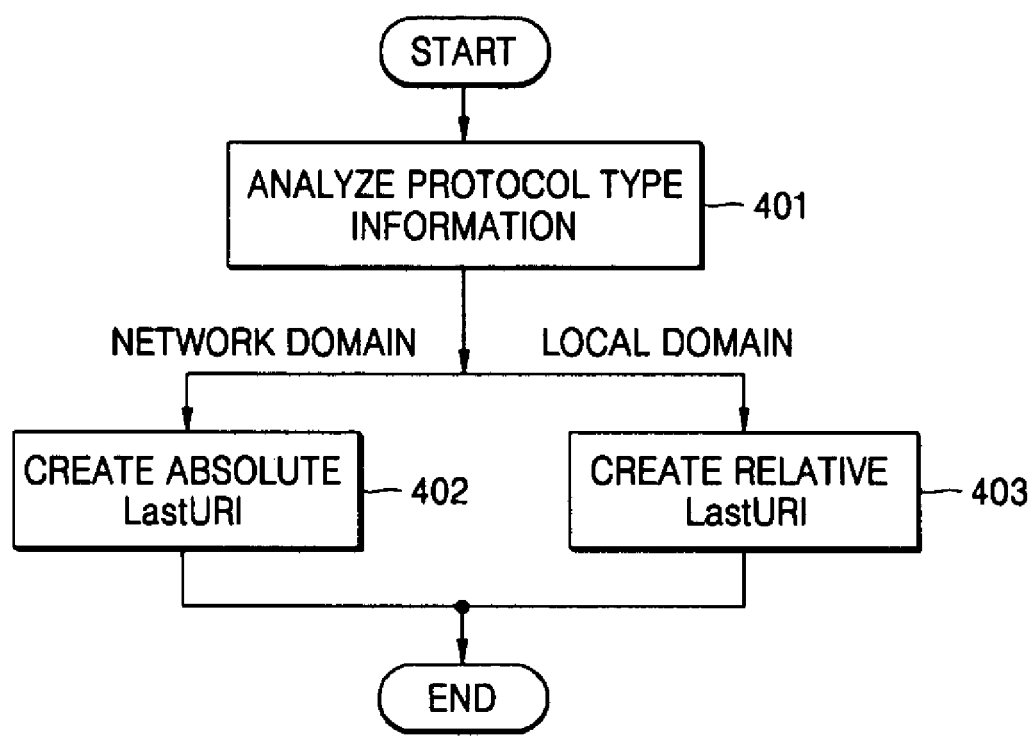
FIG. 4 is a detailed flowchart illustrating a method of creating a LastURI of a content asset based on protocol type information.

A LastURI for the content asset is created based on the detected protocol type information as illustrated in FIG. 4 (Operation 303).

FIG. 4 is a detailed flowchart illustrating a method of creating the LastURI of the content asset based on the protocol type information. Referring to FIG. 4, the protocol type information is analyzed (Operation 401). How to analyze the protocol type information is described with reference to FIG. 1.

As a result, if the protocol type information indicates a network domain, an absolute LastURI of the content asset is created as the LastURI of the content asset (Operation 402). The protocol type information and information on a path of the content asset are used to create the absolute LastURI of the content asset.

If the protocol type information indicates a local domain, a relative LastURI of the content asset is created as the LastURI of the content asset (Operation 403). The information on the path of the content asset, i.e., the location of an MPV file corresponding to the content asset, as described with reference to FIGS. 1 and 2 is used to create the relative LastURI of the content asset.

The method illustrated in FIG. 3 can be performed by an MPV file creating processor (not shown) or a LastURI creating processor (not shown) that is included in the MPV file creating processor (not shown). The LastURI creating processor is the same as the apparatus for creating the LastURI illustrated in FIG. 1.

The present invention can be realized as a computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and optical data storage.

When a LastURI of a content asset in a multimedia application environment is created according to the present invention, if a protocol type included in information on the location of the content asset is a network domain, an absolute LastURI of the content asset is created, and, if the protocol type is a local domain, a relative LastURI of the content asset is created. Therefore, the content asset can be easily found according to the present invention regardless of types of file systems used in content recorders and/or reproducers so that content recorders and/or reproducers using different file systems can share the content asset created as an MPV file.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of creating a LastURI (uniform resource identifier) comprising:
   detecting protocol type information of a content asset from information on a location of the content asset;
   creating an absolute LastURI of the content asset as the LastURI of the content asset if the protocol type information indicates a network domain; and
   creating a relative LastURI of the content asset as the LastURI of the content asset if the protocol type information indicates a local domain,
   wherein the protocol type information included in the information on the location of the content asset and information on a path of the content asset are used to create the absolute LastURI of the content asset, and
   the information on the path of the content asset based on the location of an MPV (multiphoto video) file corresponding to the content asset included in the information on the location of the content asset, is used to create the relative LastURI of the content asset.

2. An apparatus for creating a LastURI comprising:
   a hardware processor comprising:
   a detector detecting protocol type information of a content asset from information on a location of the content asset; and
   a LastURI creator creating an absolute LastURI of the content asset as the LastURI of the content asset according to a first protocol type information detected by the detector and a relative LastURI of the content asset as the LastURI of the content asset according to a second protocol type information detected by the detector,
   wherein the LastURI creator comprises:
   a first LastURI creator creating the absolute LastURI of the content asset if the protocol type information indicates a network domain; and
   a second LastURI creator creating the relative LastURI of the content asset if the protocol type information indicates a local domain,
   wherein the second LastURI creator creates the relative LastURI of the content asset using the information on the path of the content asset based on an MPV (multiphoto video) file corresponding to the content asset.

3. The apparatus of claim 2, wherein the LastURI creator further comprises: a protocol type determiner determining whether the protocol type information indicates the network domain or the local domain,
   wherein the first and second LastURI creators are operated according to a result obtained from the determination of the protocol type determiner.

4. The apparatus of claim 3, wherein the first LastURI creator creates the absolute LastURI of the content asset using the protocol type information and information on a path of the content asset.

5. The apparatus of claim 4, wherein the second LastURI creator creates the relative LastURI of the content asset using the information on the path of the content asset based on an MPV (multiphoto video) file corresponding to the content asset.

6. The apparatus of claim 3, wherein the second LastURI creator creates the relative LastURI of the content asset using the information on the path of the content asset based on an MPV (multiphoto video) file corresponding to the content asset.

7. The apparatus of claim 2, wherein the first LastURI creator creates the absolute LastURI of the content asset using the protocol type information and information on the path of the content asset.

8. A non-transitory computer readable medium having embodied thereon a computer program for executing a method of creating a LastURI specifying a location of a content asset in a multimedia application environment, the method comprising:
   detecting protocol type information of the content asset from information on the location of the content asset;
   creating an absolute LastURI as the Last URI of the content asset if the protocol type information indicates a network domain; and
   creating a relative LastURI as the LastURI of the content asset if the protocol type information indicates a local domain,
   wherein the protocol type information included in the information on the location of the content asset and information on a path of the content asset are used to create the absolute LastURI of the content asset, and
   the information on the path of the content asset based on the location of an MPV (multiphoto video) file corresponding to the content asset included in the information on the location of the content asset, is used to create the relative LastURI of the content asset.

9. A method of creating a LastURL (Uniform Resource Locator) of a content asset included in a file for controlling a multimedia content asset, the method comprising:
   detecting protocol type information of the content asset from information on a location of the content asset; and
   generating a relative LastURL of the content asset as the LastURL of the content asset according to the protocol type information,
   wherein when the protocol type information indicates a local domain, the relative LastURI of the content asset is generated as the LastURI of the content asset based on information on a path of an MPV (multiphoto video) file corresponding to the content asset included in the information on the location of the content asset.

10. The method of claim 9, wherein the file for controlling the multimedia content asset is a file according to MPV standard.

11. The method of claim 9, wherein the relative LastURL comprises a name of the content asset.

* * * * *